July 20, 1948.　　　　J. MULLER　　　　2,445,628
INSUBMERSIBLE PIPE LINE
Filed Feb. 28, 1940
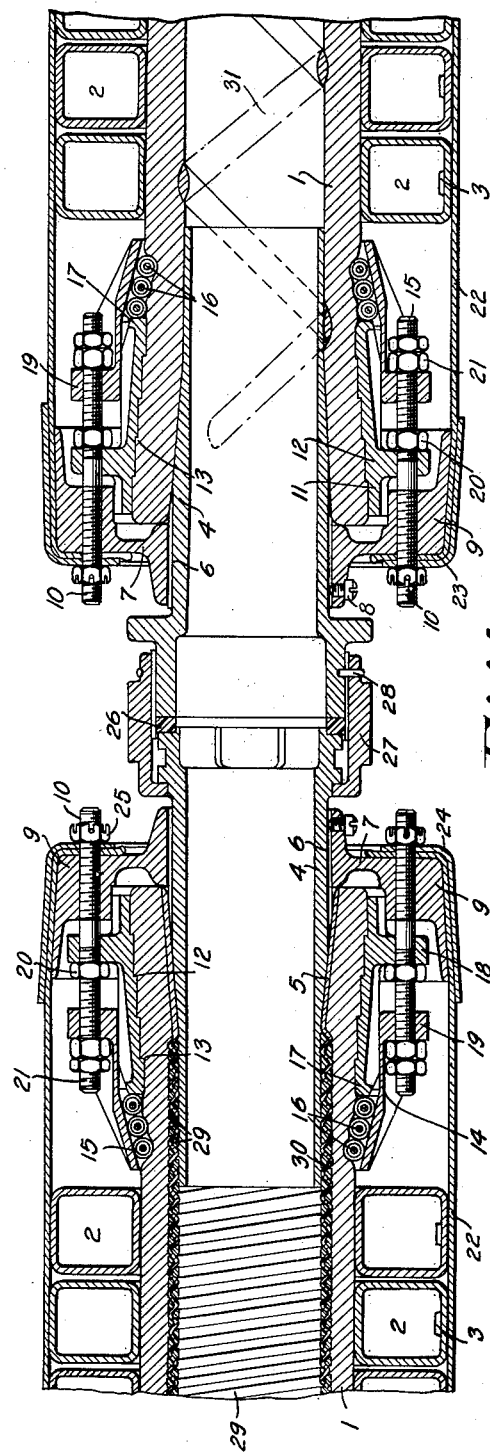
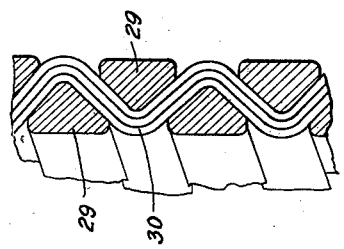
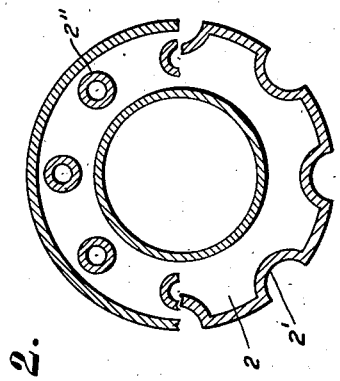
INVENTOR.
JACQUES MULLER
BY
ATTORNEYS.

Patented July 20, 1948

2,445,628

UNITED STATES PATENT OFFICE 2,445,628

INSUBMERSIBLE PIPE LINE

Jacques Müller, La Garenne-Colombes, France

Application February 28, 1940, Serial No. 321,301
In France March 1, 1939

Section 3, Public Law 690, August 8, 1946
Patent expires March 1, 1959

3 Claims. (Cl. 138—63)

Pipe lines which are employed, especially for refuelling at sea and at considerable distances, which may sometimes amount to many hundreds of metres, should for the purpose of having a long life, continuously conform with the surface of the water even in stormy weather.

In order to conform to the surface of the water, flexible pipe lines which are at present manufactured may be used.

For refuelng at sea, it is desirable that the pipe lines float on the surface of the water and for this purpose, such lines should be of light weight. It is suitable to enclose the pipe lines in extremely light weight sheaths or coverings whereby the density of the whole is less than that of the liquid on which the pipe lines float.

The distances over which the floating pipe lines are used are in a high degree variable and since commercially they can only be obtained of a limited length, they should be capable of being connected together easily and rapidly, mounted on hollow ferrules, connected together by sleeves in such a manner that fluidtightness is insured and the pipes cannot be separated from the ferrules by breaking away due to the twistings produced by the incessant moving of the water in all directions.

Finally these pipe lines should be capable of resisting flattening, by the action of pressure, of the flexible material which constitutes the core.

The insubmersible pipe line, according to the invention satisfies these desiderata.

The floating thereof is ensured by surrounding the flexible pipe proper by cellular elements, preferably pneumatic, which may be provided with inflating valves, these elements being adapted to be notched at their periphery or are formed of tubular elements which, when they are suitably juxtaposed form furrows or passages through which there pass conducting or other wires which do not project, the whole arrangement being preferably enclosed by a protecting sheath.

Each flexible element of the pipe is mounted on a rigid ferrule having an external cylindroconical surface, on which cylindrical portion are screw-threads for receiving a tightening cap.

For preventing detachment of the pipe from its ferrule, it is provided with sleeves located one after the other, one of them having a notched conical internal surface which bears against the outer surface of the flexible pipe, and the other being provided with an internal surface which is also conical but smooth and bears on the extensible and compressible rings surrounding the flexible pipe and bearing against the end of smaller diameter of the first sleeve. Screw-threaded rods secured to the cap pass through the two sleeves whilst nuts movable on the rods determine, in an adjustable manner, the relative position of the sleeves and the cap.

It will be understood that when varying at the time of assembly, the position of the nuts on the rods, the conical portions of the two sleeves will press the end of the flexible tube energetically against the ferrule; the notched portion of the first sleeve biting into the flexible material of the pipe and extensible rings are caused to penetrate into this material so as to oppose its detachment from the ferrule.

Finally for preventing crushing or flattening of the flexible pipe this is provided with an internal helicoidal and metal lining of which the essential feature is that the profile of the thread or strip employed is triangular with rounded corners. This shape has the advantage of obtaining at the start an internal surface formed by straight line elements and also it permits of the employment of a number of spirals superposed in quincunx, forming a block against any deformation and any detachment, between which is held the internal sheath of the flexible pipe. A block of this character, which nevertheless preserves any desirable flexibility, offers considerable resistance and consttutes a metal contact surface for the flow of static electricity developed by the friction in the interior of the piping. For obtaining this last result with piping having a smooth and non-conducting internal surface it may with advantage be provided with a metal spiral of large pitch and preferably of flat or extremely elongated elliptical cross-section.

Insubmersible pipe lines having the above mentioned advantages are illustrated by way of example, but not in a limiting sense, in the accompanying drawing, wherein:

Fig. 1 is a longitudinal section of a pipe line at the point of a joint;

Fig. 2 is a cross-section of the floating elements;

Fig. 3 is a longitudinal section of a flexible pipe.

1 is the flexible pipe proper. It is surrounded by juxtaposed pneumatic chambers 2 provided with an inflating valve 3. These chambers are provided with external longitudinal notches 2' or with tubular passages 2" (Fig. 2). Into the end of the pipe 1 is fitted a ferrule 4 of which the outer surface has a portion 6 on which is mounted a cap 7 with securing screws 8, the portion of the cap forming a flange 9 carrying screw-threaded bolts 10.

In the cap there is located a first sleeve 11 of which the conical internal face 12, bearing against the pipe 1, is notched at 13. Behind the sleeve 11 is located a second sleeve 14 having an internal cylindro-conical surface 15 of which the smallest diameter is greater than that of the pipe 1. In the sleeve 14 and around the pipe 1 are placed in juxtaposition extensible rings 16 which bear against the end 17, forming an abutment of the sleeve 11.

The screw-threaded bolts 10 pass through the annular parts 18, 19, respectively, of the sleeves 11, 14, whilst nuts 20, 21 engaging with the bolts 10, serve to adjust the respective positions of these parts.

The whole of the insubmersible pipe line is enclosed in a protecting sheath 22 which is folded inwardly at 23 over the flange 9 and against which it is held by the cowl 24 and the nuts 25 on the bolts 10, whereby the fluidtightness of the interior of the pipe line is ensured.

The nuts 20, 21 which are mounted on the screw-threaded rods 10 ensure, by their movement on the rods the engagement of the teeth 13 of the sleeve 11 and the penetration of the rings 16 into the flexible material of the pipe 1 under the action of the conical parts 5, 12 and 15 so as to prevent any detachment of the pipe 1 from the ferrule 4.

The ferrules 4 of the two elements of the pipe line are connected together in any appropriate manner through the medium of a fluidtight plastic joint 26 by means of a sleeve 27 with a locking device 28.

In the pipe 1 are located metal helices 29 of triangular section with rounded corners, between which there passes the internal peripheral sheath 30 of the pipe 1.

In the right-hand portion of Fig. 1, the internal periphery of the pipe 1 is smooth and is provided with a metal helix 31 of large pitch and of flattened cross-section.

The helices 29 and 31 in addition to opposing any flattening of the pipe 1, ensure the flow of static electricity.

I claim:

1. A floating fuel pipe line comprising a flexible pipe, a plurality of flexible pneumatic elements surrounding the flexible pipe, said pneumatic elements having recesses in the periphery thereof, and a metal element extending longitudinally of the pipe and positioned in said recesses.

2. A floating fuel pipe line comprising a flexible pipe, a plurality of separate annular flexible pneumatic elements surrounding the pipe line and axially spaced along said pipe line, said pneumatic elements having recesses in the periphery thereof, and a metal element extending longitudinally of the pipe and positioned in said recesses.

3. An insubmersible pipe line comprising a flexible pipe, extensible rings around the end of the flexible pipe, a sleeve having an internal conical wall and surrounding the rings, a cylindro-conical ferrule in the end of the flexible pipe, a second sleeve bearing against the extensible rings and having an internal conical and notched wall surrounding the end of the flexible pipe, the conicity of the ferrule and the second sleeve being similar, lugs carried by said sleeves and ferrule, and bolts passing through said lugs for drawing said sleeves and ferrule together to grip the wall of the pipe between the ferrule and second sleeve and to compress the rings to further grip the pipe.

JACQUES MULLER.

REFERENCES CITED

The following references are of record in the file of this patent:

UNITED STATES PATENTS

| Number | Name | Date |
|---|---|---|
| 592,017 | McCauley | Oct. 19, 1897 |
| 604,015 | Bates | Mar. 17, 1898 |
| 1,332,384 | Dray | Mar. 2, 1920 |
| 1,462,830 | Robinson | July 24, 1923 |
| 1,476,258 | Kroch | Dec. 4, 1923 |
| 1,637,701 | Levitt | Aug. 2, 1927 |
| 1,712,803 | Wood | May 14, 1929 |

FOREIGN PATENTS

| Number | Country | Date |
|---|---|---|
| 592,017 | Germany | Oct. 19, 1897 |